J. RICHARDSON.

Machine for Bundling Kindling Wood.

No. 9,490. Reissued Dec. 7, 1880.

*Witnesses:*
*L. B. Lownsend*
*A. W. Munday*

*Inventor:*
*John Richardson*
*per Munday & Evarts*
*Attorneys.*

N. PETERS, PHOTO-LITHOGRAPHER, WASHINGTON, D. C.

UNITED STATES PATENT OFFICE.

JOHN RICHARDSON, OF NEW YORK, N. Y.

MACHINE FOR BUNDLING KINDLING-WOOD.

SPECIFICATION forming part of Reissued Letters Patent No. 9,490, dated December 7, 1880.

Original No. 74,425, dated February 11, 1868. Application for reissue filed December 1, 1879.

*To all whom it may concern:*

Be it known that I, JOHN RICHARDSON, of New York, in the county of New York and State of New York, have invented certain new and useful Improvements in Bundling-Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in an improved apparatus for feeding wood to machines for bundling the same, and is more especially intended for use in connection with the machine heretofore invented by Stevens and myself.

In that machine the wood was delivered to a sharp-edged tube, which received, shaped, and held the bundle while being tied, and the apparatus herein described is for the purpose of delivering the wood to said tube, or any similar one used for the same purpose.

Figure 1:
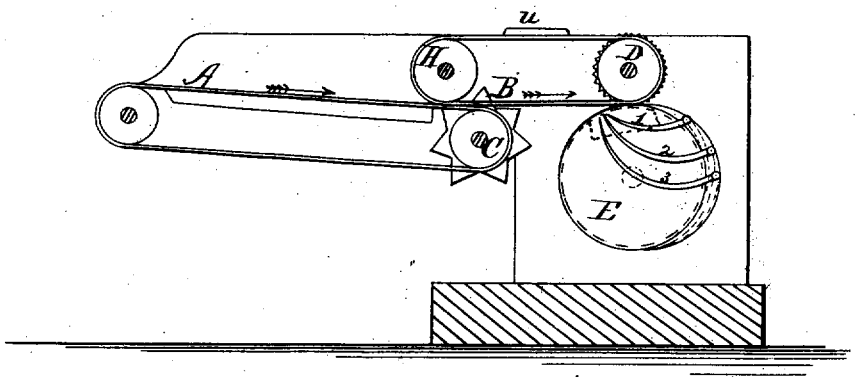
Figure 2:
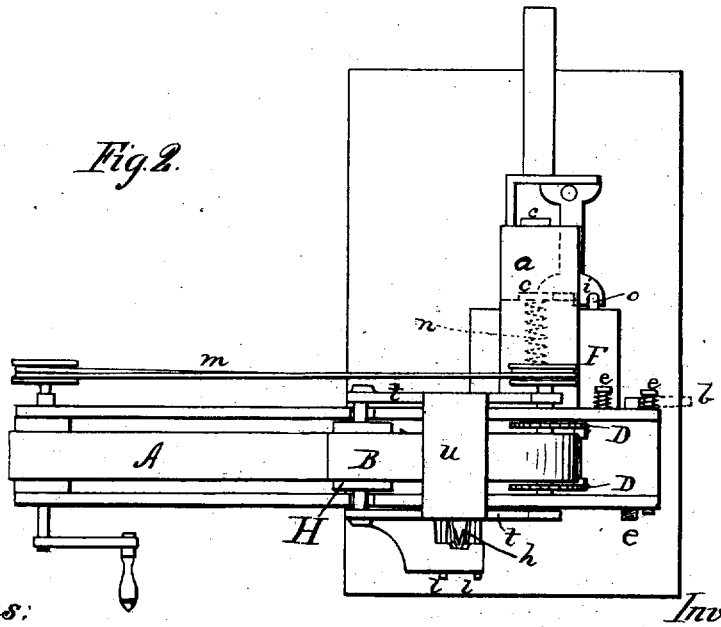

Figure 1 is a longitudinal vertical section, and Fig. 2 is a top-plan view.

The apparatus consists of a suitable frame, in which are mounted two endless belts, as represented by A and B, the under belt, A, having a portion exposed on which to place the wood, the belt B being mounted on two rolls, D and H, the latter of which is fastened in a frame having one end pivoted on the journals of the roll D, while the opposite end, with the roll H, is left free to be raised or lowered as desired, *t* representing the side bars, and *u* the cross-bar, of said frame. These belts carry the wood forward and deliver it through a suitable opening upon the curved plate 1. (Shown in Fig. 1.) A series of these curved plates (designated 1, 2, and 3) are pivoted, one above another, within the circular opening E, which is intended to correspond in size with and located directly in the rear of the bundling-tube hereinbefore alluded to. Upon the journals of these plates are secured spiral springs, as shown at *e*, Fig. 2, which tend to hold the plates up, as represented in full lines in Fig. 1, but which yield as the wood accumulates on the plates and permit them to be pressed back against the side of the opening, as shown in dotted lines in Fig. 1. The plunger which presses the wood into the sharp-edged tube, as described in the former application, works through this opening E, it being operated by being shoved forward and drawn back at the proper times, as therein described. When drawn back the plates 1, 2, and 3 are raised, and the wood is then piled or fed in upon them by the belts A and B until the opening is full and the plates shoved back, as indicated in dotted lines, and this apparatus is so connected with the machine that just at that instant the plunger F moves forward and drives or shoves the wood out of the opening E into the tube in front of it.

In order to prevent the wood from being fed into the opening at all while the plunger is being drawn back, there is a section of the plunger, as represented by *a*, that remains shoved forward, so as to close the opening through which the wood enters E and keep it closed until the plunger F gets back out of the way. This section *a* is made much longer than the body of the plunger, and is arranged so as to slide back and forth, a spiral spring, *n*, engaging against a projecting piece, *c*, attached to the outer end of the sliding section *a*, and serving to keep it back, so as to keep its front end and the front end of the plunger F even. After the plunger has been shoved in, and the section *a* with it, the projecting piece *c* slips off from the spring *i*, which rises up, so that its end catches against the projection *c*, and thereby holds the section *a* in place while the plunger is drawn back, until the latter, having nearly reached its position, strikes the spring *i* by an inclined projection, *o*, which depresses the spring *i*, thereby releasing the projecting piece *c* and permitting the section *a* to slide back, and thus open the mouth and permit the wood to again enter the opening E on the plate 1.

In order to prevent the possibility of injury in consequence of a stick not entering fair, and its front end catching against the side of the case as the plunger shoves the wood into the tube, I have a section of the case at that point made movable and attach it to guide-pins *l l*, and insert a bent spring, *h*, to hold it in position, but permit it to yield in case the end of one or more sticks gets caught against it, the spring causing it to return to its position as soon as the plunger is drawn back.

The two belts or aprons that feed the wood forward are connected by a cross-belt, *m*, as shown in Fig. 2, so as to cause them to revolve together, as indicated by arrows in Fig. 1, so as to seize the wood between them and draw it forward, there being notched wheels C and D to assist in feeding the wood forward. It is obvious that instead of the belts endless chains having spurs or hooks projecting from their surface may be substituted for feeding the wood in.

For the purpose of operating the lever that dogs or undogs the mechanism that operates the plunger at the proper time, a lever, *b*, is connected to the journal of the plate 3, so that as the opening E is filled and the plate 3 is pressed entirely back the lever *b* serves to set the plunger in operation. By these means I am enabled to feed the wood to the machine with facility and certainty.

Having thus described my invention, what I claim is—

1. The bundling-receiver provided with one or more yielding arms arranged to yield under the pressure of the material fed, in combination with mechanism for discharging the bundle, substantially as shown and described.

2. The bundling-receiver provided with one or more yielding arms arranged to yield as the material is fed in, in combination with a device for stopping the feed of the material, substantially as shown and described, whereby the bundle is automatically sized.

3. In an automatic bundling apparatus, the combination of a device such as specified for feeding forward the loose material to be bundled, a receiver into which the material is fed, provided with one or more movable arms, the yielding of which determines the size of the bundle and sets in operation the mechanism shown and described for discharging the bundle, all constructed and operating substantially as described.

4. The combination, with a bundling-receiver having an opening to admit the material to be bundled, and so arranged as to give conformation and size to the bundle formed within the receiver, and provided with a cut-off, of the feeding device, substantially as described, capable of expanding at its receiving end to receive the loose material fed automatically in varying quantities.

5. The combination, with a bundling-receiver having a suitable opening through which to admit the material to be bundled, and the feeding device, suitably connected therewith, to carry the material to the receiver, of notched wheels operating to feed the material into the receiver, as described.

JOHN RICHARDSON.

Witnesses:
EDWARD S. EVARTS,
JAMES N. W. ROOME.